United States Patent
Altstadt et al.

(10) Patent No.: US 9,741,461 B2
(45) Date of Patent: Aug. 22, 2017

(54) CONTACT PINS FOR GLASS SEALS AND METHODS FOR THEIR PRODUCTION

(71) Applicant: IL Metronic Sensortechnik GmbH, Ilmenau-Unterpoerlitz (DE)

(72) Inventors: Erhard Altstadt, Ilmenau (DE); Rolf Kirchhoff, Ilmenau (DE); Katja Nicolai, Ilmenau (DE)

(73) Assignee: IL Metronic Sensortechnik GmbH, Ilmenau-Unterpoerlitz (DE)

( * ) Notice: Subject to any disclaimer, the term of this patent is extended or adjusted under 35 U.S.C. 154(b) by 0 days.

(21) Appl. No.: 15/095,587

(22) Filed: Apr. 11, 2016

(65) Prior Publication Data

US 2016/0300633 A1     Oct. 13, 2016

(30) Foreign Application Priority Data

Apr. 9, 2015 (DE) .................. 10 2015 206 314

(51) Int. Cl.
| | | |
|---|---|---|
| *H01B 1/02* | (2006.01) | |
| *H01B 17/30* | (2006.01) | |
| *H01B 13/00* | (2006.01) | |
| *C03C 3/091* | (2006.01) | |
| *C03C 27/04* | (2006.01) | |
| *H01R 13/03* | (2006.01) | |
| *H01R 43/16* | (2006.01) | |

(52) U.S. Cl.
CPC ............... *H01B 1/02* (2013.01); *C03C 3/091* (2013.01); *C03C 27/046* (2013.01); *H01B 13/0016* (2013.01); *H01B 13/0036* (2013.01); *H01B 17/305* (2013.01); *H01R 13/03* (2013.01); *H01R 43/16* (2013.01)

(58) Field of Classification Search
CPC .... H01B 1/02; H01B 13/0016; H01B 17/305; H01B 13/0036; C03C 3/091; C03C 27/046

USPC .......................................... 174/262.2, 126.2
See application file for complete search history.

(56) References Cited

U.S. PATENT DOCUMENTS

| | | | |
|---|---|---|---|
| 2,885,826 A * | 5/1959 | Grieve | C03C 27/046 174/152 GM |
| 2,988,665 A | 6/1961 | Duran et al. | |
| 4,678,358 A | 7/1987 | Layher | |
| 6,274,252 B1 * | 8/2001 | Naugler | C03C 27/02 174/152 GM |
| 6,874,422 B2 | 4/2005 | Heeke | |
| 2013/0305948 A1 | 11/2013 | Hinkofer et al. | |
| 2015/0284866 A1 * | 10/2015 | Meyerovich | B32B 15/01 205/50 |

FOREIGN PATENT DOCUMENTS

| | | |
|---|---|---|
| DE | 963 013 C | 5/1957 |
| DE | 103 48 945 A1 | 5/2004 |
| DE | 10 2012 010 608 A1 | 11/2013 |
| DE | 10 2012 109 057 B3 | 11/2013 |
| DE | 10 2013 109 400 A1 | 3/2015 |

* cited by examiner

*Primary Examiner* — Timothy Thompson
*Assistant Examiner* — Charles Pizzuto
(74) *Attorney, Agent, or Firm* — Muncy, Geissler, Olds & Lowe, P.C.

(57) ABSTRACT

Contact pins for glass seals is provided having an iron alloy and a method for their production. The contact pins are provided with a nickel layer and coated with rhodium and/or platinum or with palladium. The contact pins may be additionally provided with a layer of gold. The contact pins are first cleaned by degreasing and activating, preferably by activating through acid etching. Thereafter, the application of a nickel layer is performed under a protective gas atmosphere, followed by formatting at 850 to 1050° C. The protective gas atmosphere is preferably made up of 10 to 100% hydrogen, with the balance formed of nitrogen. This is followed by a coating with palladium or with rhodium and platinum, or with platinum, or with rhodium and gold.

13 Claims, No Drawings

CONTACT PINS FOR GLASS SEALS AND METHODS FOR THEIR PRODUCTION

This nonprovisional application claims priority under 35 U.S.C. §119(a) to German Patent Application No. 10 2015 206 314.3, which was filed in Germany on Apr. 9, 2015, and which is herein incorporated by reference.

BACKGROUND OF THE INVENTION

Field of the Invention

The invention relates to contact pins for glass seals having an iron alloy and a method for their production.

Description of the Background Art

Conventional contact pins in electrical feedthroughs are usually electroplated with nickel, gold or tin after vitrification to achieve bondable, pluggable or solderable surfaces.

For this purpose, the contact pins are wrapped with a copper wire to produce an electrical connection for the electroplating process The disadvantage here is the high workload and a deterioration of the insulation properties of the glass.

From U.S. Pat. No. 2,885,826, which is incorporated herein by reference, it is known to use rhodium-plated metal parts for glass-metal seals and their vitrification. However, rhodium-plated contact pins have the disadvantage of limitations in soldering or bonding processes.

SUMMARY OF THE INVENTION

It is therefore an object of the invention to provide inexpensively produced, electroplated contact pins which are solderable and bondable. Further, a production method suitable for this purpose is to be created.

The contact pins according to the invention includes an iron-nickel sealing alloy which is provided with a nickel layer and is coated with rhodium and/or platinum.

Further, it is possible that the contact pins are provided with a nickel layer and are coated with palladium.

An exemplary embodiment provides that the contact pins are additionally provided with a layer of gold.

The thicknesses of the layers deposited on the contact pins can be 5 to 20 microns for the nickel layer, 0.2 to 1 micron, preferably 0.5 to 1 micron, for the rhodium layer, and/or 1 to 3 microns for the gold layer.

In the method according to an embodiment of the invention, the contact pins are first cleaned by degreasing and activating, preferably by activating through acid etching. Thereafter, the application of a nickel layer is performed under protective gas atmosphere, followed by formatting at 850 to 1050° C. The protective gas atmosphere is preferably made up of 10 to 100% hydrogen with the balance formed of nitrogen. This is followed by coating with palladium or rhodium and platinum, or with platinum, or with rhodium and gold.

Galvanic coating processes usually involve an epitaxial growth of a layer that is rather loose and inhomogeneous. Formatting can include a heat treatment of galvanically deposited layers under an inertial gas atmosphere for homogenizing these layers resulting in the layers becoming more uniform and smooth and in that their volume is compacted.

With the application of the layers according to the patent on contact pins, electroplating can be carried out prior to vitrification and thus at a much lower expense. The layers according to the patent survive the vitrification process without their usability for bonding, soldering or plugging being significantly affected, whereas gold or tin layers would be known to become unusable.

DETAILED DESCRIPTION

Embodiments of the invention are explained in more detail below with reference to examples.

Example 1

Production of a Glass Seal with Solderable Contact Pins

Contact pins having NiFe47 are cleaned by degreasing and acid etching. The surface of the contact pins is subsequently provided with a high purity nickel layer of 10-15 microns thickness by means of electroplating in a sulfamic electrolyte. Thereafter, the nickel layer is formatted for 20 min. at 900° C. in a protective gas atmosphere of 75% nitrogen and 25% hydrogen.

This is followed by a coating of 1-micron palladium, which in turn is formatted at 900° C.

The contact pins thus produced are mounted together with so-called preforms having a sealing glass with 2.36% $Al_2O_3$, 0.14% MgO, 13.8% BaO, 6.35% $K_2O$, 2.84% $B_2O_3$, 64.26 $SiO_2$, 0.36% CaO, 7.18% CaO, 7.2% $Na_2O$, 2.6% $Li_2O$ and with boards of X5CrNi18-10 in a device of E graphite. The components thus arranged are then heated in a batching furnace in a dry nitrogen atmosphere at 870° C. for a period of 25 min. to fuse the components with glass in a vacuum-tight manner. After cooling, the fusion provides a glass seal with solderable contact pins.

The solderability of the contact pins is proven according to MIL-STD-202G, METHOD 208.

Example 2

Production of a Glass Seal with Solderable Contact Pins

As described in Example 1, contact pins of FeNi29Co18 are cleaned and provided with a high purity nickel layer of 10-15 microns. After the heat treatment mentioned above, a coating of 0.5-micron rhodium and 1-micron platinum is carried out, which in turn is formatted at 900° C.

The contact pins thus produced are mounted together with preforms having a sealing glass Schott 8250 and turned parts of NiCr22Mo9Nb in a device of E graphite. The components thus arranged are then heated in a batching furnace in a dry protective gas atmosphere at 1020° C. for a period of 35 min. to fuse the components with the glass in a vacuum-tight manner.

After cooling, the fusion provides a glass seal with both solderable and pluggable contact pins.

The solderability and pluggability of the contact pins has been proven according to MIL-STD-202G, METHOD 208, and according to DIN42802.

Example 3

Production of a Glass Seal with Solderable and Bondable Contact Pins

As described in Example 1, contact pins of FeNi29Co18 are cleaned and provided with a high purity nickel layer of 5 microns. After the heat treatment mentioned above, a coating is carried out with 1-micron platinum, which in turn is formatted at 900° C.

The contact pins thus produced are mounted together with the preforms of a sealing glass called IN3 by the company Electroglass and flanges having titanium grade 5 in a device of E graphite. The components thus arranged are fused as in Example 1, but in an argon atmosphere.

After cooling, the fusion results in a glass seal with both solderable and ultrasound-bondable contact pins.

The wire bonding test was satisfied in accordance with MIL-STD-883, according to method 2023.5.

Example 4

Production of a Glass Seal with Solderable and Bondable Contact Pins

As described in Example 1, contact pins of NiFe47 are cleaned and provided with a high purity nickel layer of 5 microns. After the heat treatment mentioned above, a coating of 0.5 µmRh and subsequently of 2.5 fine gold is carried out, which in turn is formatted at 900° C. Once formatted, the gold color is removed from the gold layer, similar to a white gold alloy. The contact pins thus produced are fused as in Example 1.

The fusion results in a glass seal with both solderable and US-bondable contact pins.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A glass seal comprising:
   contact pins; and
   an iron-nickel sealing alloy,
       wherein the contact pins are provided with a nickel layer formatted at 850° C. to 1050° C. in a protective gas atmosphere and a coating layer.

2. The glass seal according to claim 1, wherein the coating layer is palladium.

3. The glass seal according to claim 1, wherein the contact pins are additionally provided with a gold layer formatted at 800° C. to 950° C.

4. The glass seal according to claim 1, wherein the nickel layer has a thickness of 5 to 20 microns.

5. The glass seal according to claim 1, wherein the coating layer is a rhodium layer having a thickness of 0.5 to 1 micron.

6. The glass seal according to claim 3, wherein the gold layer has a thickness of 1 to 3 microns.

7. The glass seal according to claim 1, wherein the coating layer is rhodium.

8. The glass seal according to claim 1, wherein the coating layer is platinum.

9. A method for producing a glass seal having contact pins, the method comprising:
   cleaning contact pins having an iron nickel sealing alloy by degreasing and activating;
   depositing a nickel layer onto the contact pins by galvanizing in an electrolyte;
   formatting the nickel layer at 850° C. to 1050° C. in a protective gas atmosphere;
   depositing a coating layer on the contact pins and formatting the coating layer at 850° C. to 1050° C.;
   mounting the contact pins with preforms comprising a sealing glass in a device having graphite; and
   vacuum-tight fusing of the contact pins with glass in a protective gas atmosphere at least 800° C. to 1100° C.

10. The method for producing the glass seal according to claim 9, wherein the coating layer is palladium.

11. The method for producing the glass seal according to claim 9, wherein the coating layer comprises rhodium and platinum.

12. The method for producing the glass seal according to claim 9, wherein the coating layer is platinum.

13. A method for producing a glass seal having contact pins, the method comprising:
   cleaning contact pins having an iron nickel sealing alloy by degreasing and activating;
   depositing a nickel layer onto the contact pins by galvanizing in an electrolyte;
   formatting the nickel layer at 850° C. to 1050° C. in a protective gas atmosphere;
   depositing a coating layer on the contact pins and formatting the coating layer at 800° C. to 950° C., wherein the coating layer comprises rhodium and gold;
   mounting the contact pins with preforms comprising a sealing glass in a device having graphite; and
   vacuum-tight fusing of the contact pins with glass in a protective gas atmosphere at least 800° C. to 900° C.

* * * * *